US006624261B1

(12) United States Patent
Moad et al.

(10) Patent No.: US 6,624,261 B1
(45) Date of Patent: Sep. 23, 2003

(54) CATALYTIC POLYMERIZATION PROCESS

(75) Inventors: Graeme Moad, Kallista (AU); Ezio Rizzardo, Wheeler Hill (AU); Catherine Louise Moad, Kallista (AU); Steven Dale Ittel, Wilmington, DE (US); Lech Wilczek, Wilmington, DE (US); Alexei A. Gridnev, Wilmington, DE (US)

(73) Assignees: E. I. du Pont Nemours and Company, Wilmington, DE (US); Commonwealth Scientific and Industrial Research Organization, Victoria (AU)

( * ) Notice: Subject to any disclaimer, the term of this patent is extended or adjusted under 35 U.S.C. 154(b) by 0 days.

(21) Appl. No.: 09/125,467

(22) PCT Filed: Feb. 18, 1997

(86) PCT No.: PCT/US97/02912

§ 371 (c)(1),
(2), (4) Date: Aug. 19, 1998

(87) PCT Pub. No.: WO97/31030

PCT Pub. Date: Aug. 28, 1997

(51) Int. Cl.[7] .................................................. C08F 2/00
(52) U.S. Cl. .............................. 526/86; 526/73; 526/79; 526/140; 526/319; 526/329.1; 526/346
(58) Field of Search ............................. 526/86, 93, 80, 526/346, 82, 73, 79, 319, 329.1; 556/140

(56) References Cited

U.S. PATENT DOCUMENTS

| 4,680,352 | A | | 7/1987 | Janowicz et al. ........... 526/147 |
| 4,680,354 | A | | 7/1987 | Lin et al. .................... 526/172 |
| 5,310,807 | A | * | 5/1994 | Antonelli et al. ........... 525/286 |
| 5,324,879 | A | | 6/1994 | Hawthorne .................. 585/511 |
| 5,362,813 | A | * | 11/1994 | Antonelli et al. ........... 525/286 |
| 5,756,605 | A | * | 5/1998 | Moad et al. .................. 526/93 |

FOREIGN PATENT DOCUMENTS

WO    WO 96/15158    *    5/1996

OTHER PUBLICATIONS

M. P. Greuel et al., Copolymerization with Catalytic Chain Transfer, *Polymer Preprints*, 32, 545 and 546, 1991.

* cited by examiner

*Primary Examiner*—Tatyana Zalukaeva
(74) *Attorney, Agent, or Firm*—Sudhir G. Deshmukh

(57) ABSTRACT

This invention relates to a process for controlling the architecture of copolymers of at least two unsaturated monomers, made by free-radical polymerization in the presence of a cobalt-containing chain transfer agent, including the control of molecular weight, degree of branching and vinyl end group termination, by varying at least one of the variables of molar ratio of monomers, their relative chain transfer constants, polymerization temperature and degree of conversion and amount of cobalt chain transfer agent; and polymers made thereby.

7 Claims, No Drawings

CATALYTIC POLYMERIZATION PROCESS

BACKGROUND OF THE INVENTION

Catalytic chain transfer is an effective way to control the molecular weight of polymers of methacrylates and styrenes. It is known that chain transfer catalysis (CTC) products contain a terminal vinylidene bond. This feature makes these products attractive as macromonomers for a variety of applications. However, CTC has not been known to be applicable for reduction of molecular weight in the polymerizations of other vinylic monomers such as acrylates.

Copolymerizations of methacrylate monomers with monosubstituted monomers in the presence of cobalt have been described in the art. However, the monosubstituted monomer is almost always present as a minor component. U.S. Pat. No. 4,680,354 describes molecular weight reduction using various Co(II) complexes in MMA-BA, MMA-EA and MMA-BA-St copolymerizations, wherein the abbreviations represent:

MMA=methyl methacrylate
BA=butyl acrylate
EA=ethyl acrylate
St=styrene.

U.S. Pat. No. 5,324,879 describes molecular weight reduction with Co(III) complexes in EA, St, and vinyl acetate (VAc) polymerizations, and MMA-EA copolymerization.

U.S. Pat. No. 4,680,352 describes molecular weight reduction and macromonomer (polymers or copolymers with unsaturated end-groups) synthesis in copolymerizations with acrylates and styrene with various Co(II) complexes. Various terpolymerizations are cited therein; however, no evidence of the nature or existence of terminal double bonds is given.

Gruel et al., Polymer Preprints, 1991, 32, p. 545, reports the use of Co(II) cobaloximes in low conversion St-MMA copolymerizations at low temperatures with end group analysis.

The references cited above cover the copolymerization of acrylates and styrene with methacrylate monomers, but do not disclose synthetic conditions for production of high purity macromonomers based on acrylates and styrene, nor branching of the resulting products. The conditions disclosed are unlikely to yield high purity macromonomers for systems composed predominantly of monosubstituted monomers. Disclosed temperatures of less than 80° C. are likely to provide substantial amounts of undesired graft copolymer at high conversion rates.

SUMMARY OF THE INVENTION

This invention concerns an improvement in a process for the free-radical polymerization of at least two unsaturated monomers to form a polymer whose molecular architecture comprises properties of molecular weight, branching, and vinyl-terminated end groups, the monomers having the formula $$CH_2=CXY$$

wherein
  X is selected from the group consisting of H, $CH_3$, and $CH_2OH$;
  Y is selected from the group consisting of OR, $O_2CR$, halogen, $CO_2H$, COR, $CO_2R$, CN, $CONH_2$, CONHR, $CONR_2$ and R';
  R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and
  R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;
  by contacting said monomers with a cobalt-containing chain transfer agent and a free radical initiator at a temperature from about 80° to 170° C.;
the improvement which comprises controlling polymer architecture by introducing into the presence of the chain transfer agent at least one each of monomers A and B in the molar ratio of A:B, said molar ratio lying in the range of about 1,000:1 to 2:1, wherein for monomer A X is H and for monomer B X is methyl or hydroxymethyl; by one or more of the following steps:
  I decreasing the ratio of A:B from about 1,000:1 toward 2:1;
  II increasing the temperature from above 80° C. toward 170° C.;
  III increasing the conversion of monomer to polymer toward 100% from less than about 50%;
  IV decreasing the ratio of the chain transfer constant of A:B to below 1; and
  V increasing the concentration of cobalt chain transfer agent;
whereby:
  to effect lower molecular weight, employ at least one of steps I, II, IV and V;
  to effect a higher degree of vinyl-terminated end groups, employ at least one of steps I, II, IV, and V; and
  to effect increased branching, employ at least one of steps I, II, IV, and V with step III.

The nature of the derived products changes as a function of time. In the initial stages, linear macromonomers with one monomer-A in the terminal position can be obtained as essentially the only product. If the cobalt CTC catalyst levels are relatively low then CTC does not occur after every B-monomer insertion and the product mixture can include monomer-B units in the polymer chain as well as in the terminal position.

Cobalt chain transfer agent is employed in the form of cobalt complexes. Their concentrations are provided in the Examples in terms of ppm by weight of total reaction mass. Concentration will vary from 10 ppm to 1,500 ppm, preferably 10 to 1,000 ppm.

Later in the course of the reaction, when the concentration of the two above products is increased, then they can be reincorporated into a growing polymer chain. Thus, mono-branched product is obtained in the later stages of the reaction, usually around 90% conversion. At conversions above 95%, branches begin to appear on the branches, and the polymer becomes hyperbranched as conversions approach 100%.

Preferred monomers A are selected from the group consisting of acrylates, acrylonitrile and acrylamides;

and preferred monomers B are selected from the group:

a) substituted or unsubstituted α-methylstyrenes;
b) substituted or unsubstituted alkyl methacrylates, where alkyl is $C_1$–$C_{12}$;
c) methacrylonitrile;
d) substituted or unsubstituted methacrylamide;
e) 2-chloropropene,
f) 2-fluoropropene,
g) 2-bromopropene,
h) methacrylic acid,
i) itaconic acid,
j) itaconic anhydride, and
k) substituted or unsubstituted styrenics.

If branched polymers are the desired product, it is possible to initiate the described process in the presence of preformed macromonomers. They can be of the type described in this patent. They can also be macromonomers based entirely upon methacrylates or the related species described previously in U.S. Pat. No. 4,680,354. Such a process would lead to products fitting the description above, but would allow for greater control over the polymer end-groups.

The branched polymers made by said process are polymers of this invention having the formula:

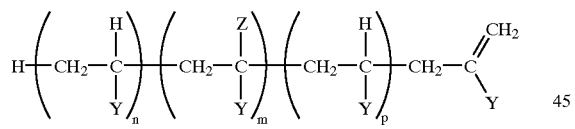

Y is as earlier defined;
n=1–20, m=1–5, p=1–20, and n+m+p≧3, and
Z is selected from the group $CH_2CHYCH_3$, $CH_2CMeYCH_3$, and, optionally,

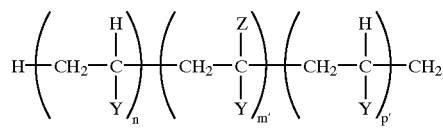

m'=0–5, p'=0–20; n+m'+p'≧2;

and if m or m'>1, the m or m' insertions respectively are not consecutive.

This invention also concerns a process comprising selecting A and B so the ratio of their chain transfer constants is less than 1, whereby functionality derived from Monomer B will be located on the vinyl-terminated end of the polymer.

This invention also concerns an improved process for the free-radical polymerization of at least two unsaturated monomers having the formula

$$CH_2=CXY$$

wherein

X is selected from the group consisting of H, $CH_3$, and $CH_2OH$;

Y is selected from the group consisting of OR, $O_2CR$, halogen, $CO_2H$, $CO_2R$, CN, $CONH_2$, CONHR, $CONR_2$, COR and R';

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen, and the number of carbons in said alkyl groups is from 1 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, substituted and unsubstituted alkyl, substituted and unsubstituted aryl, substituted and unsubstituted olefin and halogen;

by contacting said monomers with a cobalt-containing chain transfer agent and a free radical initiator at a temperature from about 80° C. to 170° C.;

the improvement which comprises controlling molecular weight of the polymer architecture by introducing into the presence of the chain transfer agent at least one each of monomers C and D in the molar ratio of C:D in the range of about 1,000:1 to 2:1, in which for monomer C, X is H and Y≠R' and for monomer D, X is H and Y=R' by:

decreasing the ratio of C:D from about 1,000:1 toward 2:1; or increasing the temperature from above 80° C. toward 170° C.

Preferred monomers C are selected from the group consisting of acrylates, acrylonitrile and acrylamides;

and preferred monomers D are substituted and unsubstituted styrenics.

The polymers made by said process improvement are polymers of this invention having the formula:

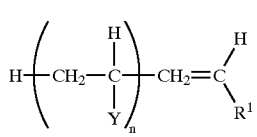

where Y≠R' and n≧1.

This invention also concerns a process improvement for polymerizing monomer(s) in the presence of an excess of a nonpolymerizable olefin, $Y^1Y^2C=CY^3Y^4$. The product in the initial stages of the polymerization will be composed primarily of

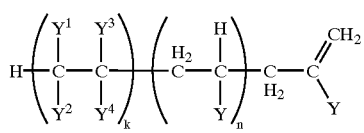

wherein:
- $Y^1$ and $Y^3$, and optionally $Y^2$ and $Y^4$, are each independently selected from the group consisting of —CH(O), —CN, —C(O)OR$^5$, —C(O)NR$^6$R$^7$, —CR$^8$(O), alkyl, aryl, substituted alkyl, substituted aryl; or
- where $Y^1$ and $Y^3$ or $Y^2$ and $Y^4$ are combined in a cyclic structure which includes any of the above functionalities, or can be —C(O)—(CH$_2$)$_x$—, —C(O)—O—(CH$_2$)$_x$—, —C(O)O—C(O)—, —C(O)(CH$_2$)$_x$—, —C(O)NR$^9$—(CH$_2$)$_x$—, wherein x=1–12, R$^5$,R$^6$,R$^7$,R$^8$, or R$^9$ are hydrogen, alkyl, aryl, substituted alkyl, or substituted aryl; and where at least one of $Y^1$ and $Y^3$ is selected from the group consisting of —CH(O), —CN, —C(O)OR$^5$, —C(O)NR$^6$R$^7$, —CR$^8$(O), aryl, substituted aryl; and the remaining of $Y^2$ and $Y^4$ are —H.

The polymers made by said process improvement are polymers of this invention produced at later stages of the polymerization process having the formula:

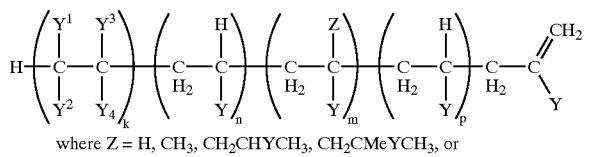

where Z = H, CH$_3$, CH$_2$CHYCH$_3$, CH$_2$CMeYCH$_3$, or

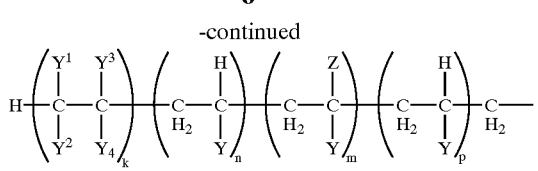

k=0 or 1, n=0–20, m=0–5, p=0–20; and k+n+m+p≧2; if m>1, then it is not intended to imply that the m insertions are consecutive;

Y is selected from the group consisting of OR, O$_2$CR, halogen, CO$_2$H, COR, CO$_2$R, CN, CONH$_2$, CONHR, CONR$_2$ and R'; and $Y^1$ to $Y^4$ and R, and R' are as defined above.

DETAILS OF THE INVENTION

We have discovered that, with addition of small amounts of an α-methylvinyl monomer and appropriate choice of reaction conditions, polymerization of monosubstituted monomers in the presence of a metal complex can provide high yield of macromonomers. These macromonomers can subsequently be used for the synthesis of a wide range of block and graft copolymers.

This invention concerns a method for the synthesis of ω-unsaturated macromonomers composed predominantly of monosubstituted monomers. The macromonomers are prepared by polymerizing a monosubstituted monomer as the major component (for example styrene) in the presence of a disubstituted α-methylvinyl monomer (for example, α-methylstyrene, herein also referred to as "AMS") and a catalytic amount of a cobalt complex [for example, Co(II) (DMG-BF2)2] called CoII in Scheme 1. Reaction Scheme 1 illustrates the process where monomer A=styrene and monomer B=α-methylstyrene. The process is applicable to a wide range of monosubstituted monomers (for example acrylate esters, vinyl acetate (VAc)) and other non-α-methylvinyl monomers.

Scheme 1

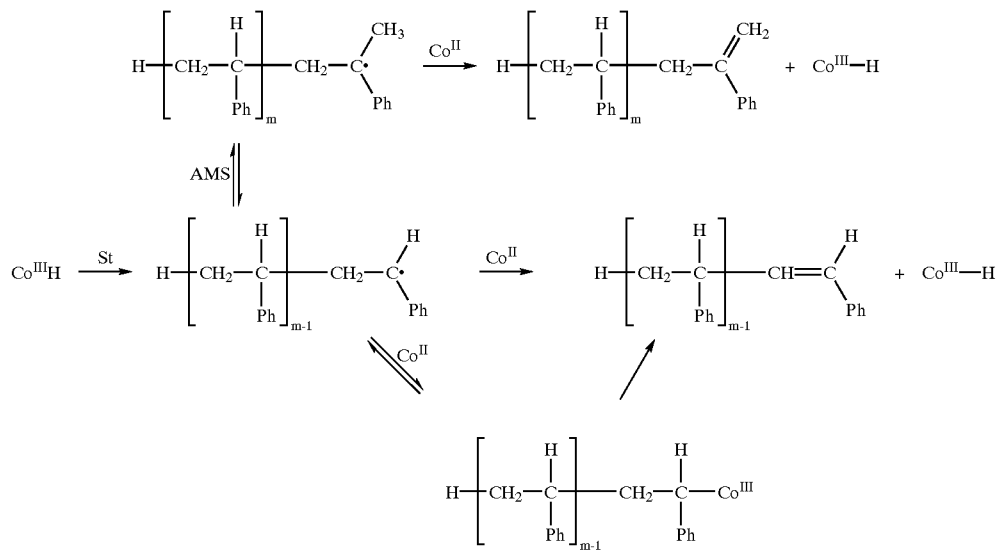

In Scheme 1, "Ph" represents a phenyl group, and "m" designates the number of monomer units in the polymer, and is ≧1.

The key features of the invention are the addition of small amounts of α-methylvinyl monomers and the use of high reaction temperatures in the presence of chain transfer catalysts.

The incorporation of α-methylvinyl monomers into the recipe allows formation of the desired macromonomer end group. In the absence of the α-methylvinyl monomer, polymerization of monosubstituted monomers give polymers with internal double bonds (styrenic monomer) or a stable alkyl-cobalt species (acrylate monomers) as chain ends.

The use of high reaction temperatures (>100° C.) favors the formation of pure linear macromonomers from monosubstituted monomers (for example acrylates, vinyl esters, and styrene). At lower temperatures we have shown that the formed macromonomers can react further by copolymerization to give branched polymers. Even though the macromonomers can undergo further reaction, at reaction temperatures >100° C., the radicals so formed do not propagate to give branched polymers. Rather, they fragment to give back a macromonomer. It is possible that this chemistry will also reduce the polydispersity of the final product.

The invention also provides a route to block or graft copolymers as illustrated in Scheme 2. The product derived by copolymerization of the macromonomer in the presence of monomers can be determined by appropriate choice of the monomer and the reaction conditions.

In Scheme 2, "Ph" represents a phenyl group; "m", "n" and "o" designate the number of monomer units in the polymer; and X and Y are as defined above.

We have demonstrated that styrene macromonomers prepared by the above mentioned copolymerization route give chain transfer (by an addition fragmentation mechanism) and have acceptable chain transfer constants at temperatures >100° C. They should therefore be useful in the preparation of block copolymers.

One further aspect of the invention is that by appropriate choice of the α-methylvinyl monomer the method is also a route to end-functional polymers. For example, use of a hydroxyethyl- or glycidyl-functional monomer would yield polymers with ω-hydroxy or ω-epoxy groups, respectively.

This method enables the versatility and robustness of the cobalt technology to be utilized to form macromonomers that are comprised predominantly of monosubstituted monomers. Additionally, it provides the key step in a new and less expensive route to end-functional and block or graft copolymers based on monosubstituted monomers. Copolymerizations of monosubstituted monomers with other α-methylvinyl monomers (for example α-methylstyrene) in the presence of cobalt are contemplated.

The choice of the α-methylvinyl comonomer is important in macromonomer synthesis. It must be chosen so that the reactivity towards cobalt ("catalytic chain transfer constant") of the derived propagating species is substantially greater than that of the propagating species derived from the monosubstituted monomer.

Two factors influence this reactivity.

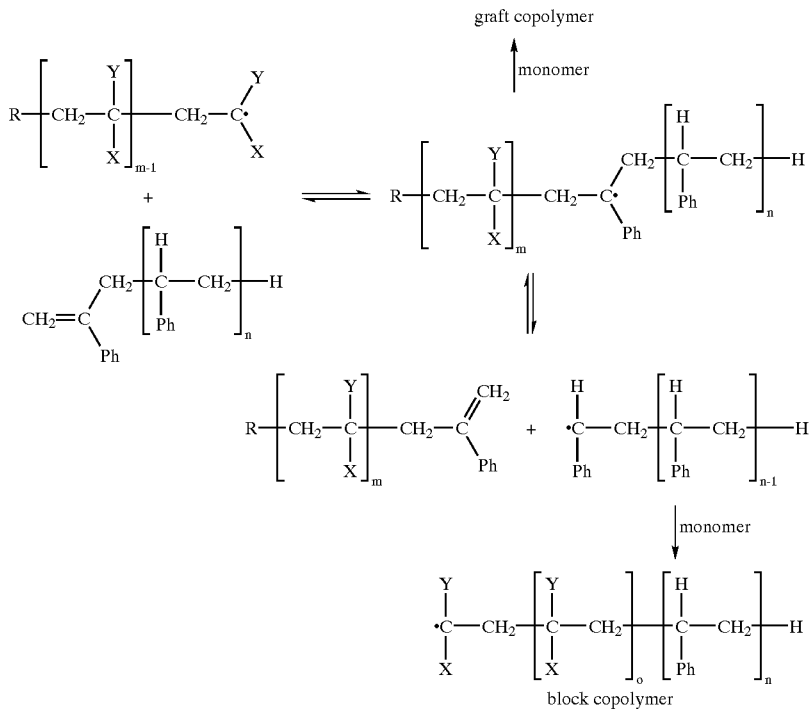

Scheme 2 a) The rate of the chain transfer reaction between the propagating species and the cobalt complex;

b) The relative concentrations of the propagating species. This is determined not only by the monomer concentration but also by the propagation rate constants and reactivity ratios.

While methacrylate esters can be used as α-methylvinyl comonomers (see examples), in copolymerization with styrene, the values of the reactivity ratios and propagation rate constants will favor the formation of styryl chain ends. The product then has an internal rather than the desired terminal double bond. Methacrylate esters are acceptable comonomers in, for example, acrylate polymerizations.

Thus, the use of α-methylvinyl comonomers (for example, α-methylstyrene, methacrylonitrile) which have low propagation rate constants and high chain transfer rate constants are preferred.

There are substantial cost improvements over alternative technologies which involve the use of stoichiometric amounts of an organic transfer agent. The ability to use acrylate/styrenic rich macromonomers, in contexts similar to those developed for methacrylate monomer products by cobalt mediated processes, for example, in graft, star, block and branched copolymer syntheses, further extends the value of the process.

The nature of the derived products changes as a function of time. In the initial stages, the product

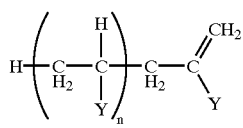

can be obtained as essentially the only product. If the cobalt CTC catalyst levels are relatively low then CTC does not occur after every B-monomer insertion and the product mixture can include:

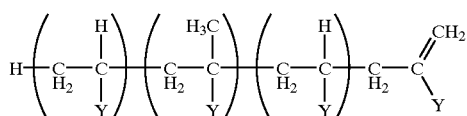

Later in the course of the reaction, when the concentration of the two above products is increased, they can be reincorporated into a growing polymer chain. Thus, the product

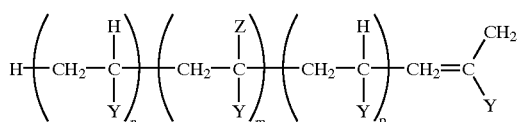

where Z can include —H, —CH$_3$, CH$_2$CHYCH$_3$, CH$_2$CMeYCH$_3$, or

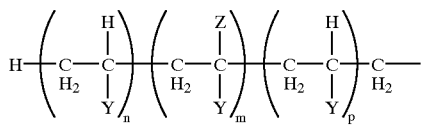

is obtained. In the early stages of the reaction, Z is most often H, but as the reaction proceeds toward 90% conversion, Z begins to include more of the higher molecular weight species as branches. At conversions above 95%, branches begin to appear on the branches, and the polymer becomes hyperbranched as conversions approach 100%.

Metal complexes are those that give catalytic chain transfer with α-methylvinyl monomers. Examples include, but are not limited to, cobalt(II) and cobalt(III) chelates:

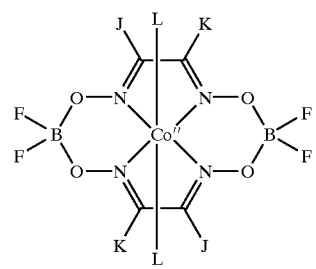

Co(II)(DPG-BF$_2$)$_2$    J = K = Ph, L = ligand
Co(II)(DMG-BF$_2$)$_2$    J = K = Me, L = ligand
Co(II)(EMG-BF$_2$)$_2$    J = Me, K = Et, L = ligand
Co(II)(DEG-BF$_2$)$_2$    J = K = Et, L = ligand
Co(II)(CHG-BF$_2$)$_2$    J = K = ——(CH$_2$)$_4$—, L = ligand

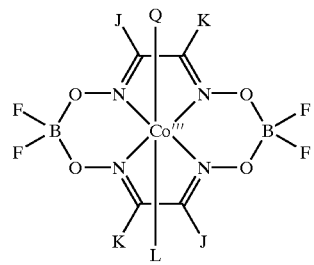

QCo(III)(DPG-BF$_2$)$_2$    J = K = Ph, R = alkyl, L = ligand
QCo(III)(DMG-BF$_2$)$_2$    J = K = Me, R = alkyl, L = ligand
QCo(III)(EMG-BF$_2$)$_2$    J = Me, K = Et, R = alkyl, L = ligand
QCo(III)(DEG-BF$_2$)$_2$    J = K = Et, R = alkyl, L = ligand
QCo(III)(CHG-BF$_2$)$_2$    J = K = ——(CH$_2$)$_4$—, R = alkyl, L = ligand
QCo(III)(DMG-BF$_2$)$_2$    J = K = Me, R = halogen, L = ligand L can be a variety of additional neutral ligands commonly known in coordination chemistry. Examples include water, amines, ammonia, phosphines, The catalysts can also include cobalt complexes of a variety of porphyrin molecules such as tetraphenylporphyrin, tetraanisylporphyrin, tetramesitylporphyrin and other substituted species.

α-Methylvinyl monomers (B monomers) have the general structure

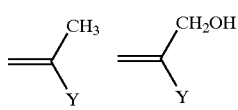

where Y is as described above in the "Summary". R is an optionally substituted alkyl (such as fluoroalkyl, hydroxyalkyl, or epoxyalkyl), organosilyl, or aryl group. Preferred examples of α-methylvinyl monomers (B monomers) include methacrylate esters, α-methylstyrene and methacrylonitrile.

"A" monomers have the general structure:

where Y is as described above in the "Summary".

The enhanced utility of the polymerization method discussed in this invention is that it extends each of these general CTC methodologies:

i) molecular weight control is extended from methacrylates and styrenes to include acrylates, vinyl esters, and other higher activity monomer species;
ii) macromonomer synthesis is extended to the monomers in (i) while retaining the desirable vinyl termination of the resulting species;
iii) end-functional polymer synthesis is also extended to the monomers in (i);
iv) the use of macromonomers as chain transfer agents is extended to include monomer classes heretofore unavailable through CTC technology; and
v) not only are a wider range of block and graft copolymers available through the use of CTC technology, but now it is possible to prepare branched and even hyperbranched species through single-pot reactions.

It is preferred to employ free-radical initiators and solvents in the process of this invention. The process can be run in batch, semi-batch, continuous, bulk, emulsion or suspension mode.

Most preferred A-monomers are:
methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, glycidyl acrylate, 2-hydroxyethyl acrylate, hydroxypropyl acrylate (all isomers), hydroxybutyl acrylate (all isomers), diethylaminoethyl acrylate, triethyleneglycol acrylate, N-tert-butyl acrylamide, N-n-butyl acrylamide, N-methyl-ol acrylamide, N-ethyl-ol acrylamide, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilyipropyl acrylate, dibutoxysilylpropyl acrylate, diisopropoxysilylpropyl acrylate, vinyl acetate, styrene, diethylamino styrene, P-methylstyrene, vinyl benzoic acid, vinylbeuzinsulfonic acid, vinyl propionate, vinyl butyrate, vinyl benzoate, vinyl chloride, vinyl fluoride, vinyl bromide.

Most preferred B-monomers are:
methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromideitaconic aciditaconic anhydridedimethyl itaconate, methyl itaconateN-tert-butyl methacrylamide, N-n-butyl methacrylamide, N-methyl-ol methacrylamide, N-ethyl-ol methacrylamide, isopropenylbenzoic acid (all isomers), diethylamino alphamethylstyrene (all isomers), para-methyl-alpha-methylstyrene (all isomers), diisopropenylbenzene (all isomers), isopropenylbenzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, and TMI® dimethyl Meta-Isopropenylbenzyl Isocyanate.

Preferred C monomers are those from the list of A monomers minus the styrenic family.

Preferred D monomers include the following styrenes:

styrene, vinyl benzoic acid (all isomers), diethylamino styrene (all isomers), para-methylstyrene (all isomers), and vinyl benzene sulfonic acid (all isomers), Typical products of the reaction at lower conversions include the linear products from methyl acrylate and methyl methacrylate:

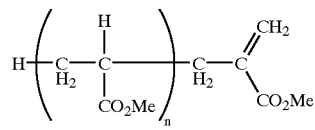

from butyl acrylate and alpha-methylstyrene:

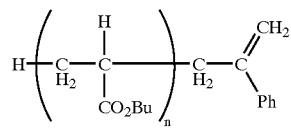

from hydroxyethyl acrylate and alpha-methylstyrene:

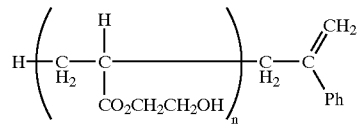

from vinyl benzoate and butyl methacrylate:

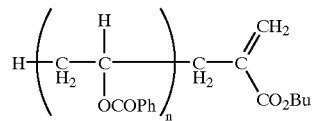

Typical products of the reaction at lower conversions include the linear products from butyl acrylate and methyl methacrylate:

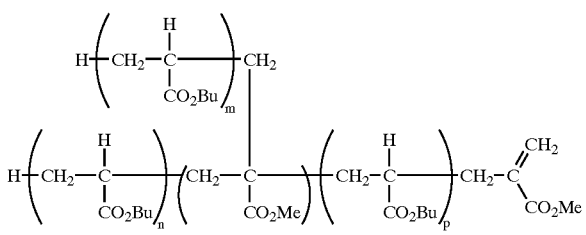

from methyl acrylate and alpha-methylstyrene:

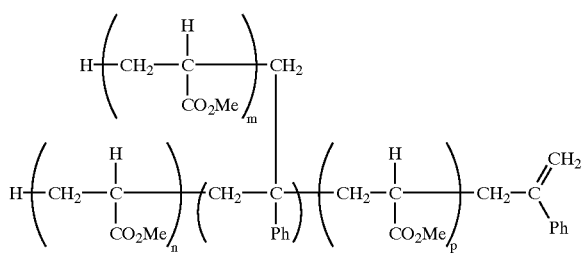

When the polymerization (for example butyl acrylate as A-monomer and methyl methacrylate as B-monomer) is carried out in the presence of a nonpolymerizable olefin such as 2-pentenenitrile, the product in the initial stages of the polymerization will be:

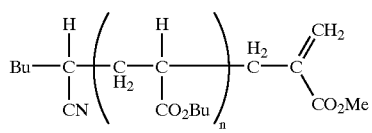

and later in the polymerization, the product will be:

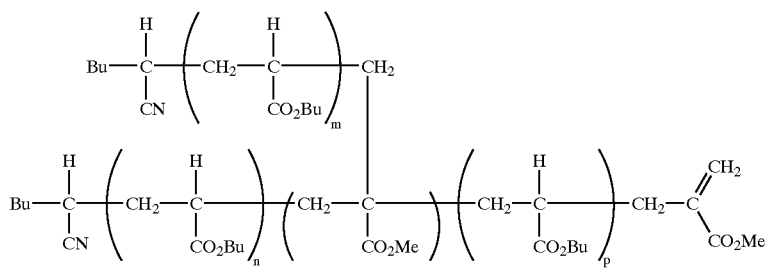

It becomes impractical to draw schematics of any of the higher degrees of branching that are obtained as the conversion of the polymerization approaches 100%.

Oligomers, macromonomers and polymers made by the present process are useful in a wide variety of coating and molding resins. Other potential uses can include cast, blown, spun or sprayed applications in fiber, film, sheet, composite materials, multilayer coatings, photopolymerizable materials, photoresists, surface active agents, dispersants, adhesives, adhesion promoters, coupling agents, compatibilizers and others. End products taking advantage of available characteristics can include, for example, automotive and architectural coatings or finishes, including high solids, aqueous or solvent based finishes. Polymers, such as those produced in this invention, will find use in, for example, structured polymers for use in pigment dispersants.

$K^+$IDS mass spectroscopy is an ionization method that produces pseudomolecular ions in the form of $[M]K^+$ with little or no fragmentation. Intact organic molecules are desorbed by rapid heating. In the gas phase, the organic molecules are ionized by potassium attachment. Potassium ions are generated from an aluminosilicate matrix that contains $K_2O$. All of these experiments were performed on a Finnegan Model 4615 GC/MS quadrupole mass spectrometer (Finnegan MAT (USA), San Jose, Calif.). An electron impact source configuration operating at 200° C. and a source pressure of $<1\times10^{-6}$ torr was used. MALDI was also performed on this instrument.

All MW and DP measurements were based on gel permeation chromatography (GPC) using styrene as a standard.

Definitions

The following abbreviations have been used and are defined as:

TAPCo=meso-tetra(4-methoxyphenyl)porphyrin-Co; VAZO®-88=1,1'-azobis(cyclohexane-1-carbonitrile) (DuPont Co., Wilmington, Del.); VRO-110=2,2'-azobis (2,4,4-trimethylpentane) (Wako Pure Chemical Industries, Ltd., Osaka, Japan);

DP=degree of polymerization. $M_n$ is number average molecular weight and $M_w$ is weight average molecular weight. AIBN is azoisobutyronitrile. THF is tetrahydrofuran. MA=methylacrylate.

EXAMPLES

Examples 1–9

Synthesis of Low Molecular Weight Styrene Macromonomers

AMS Comonomer

Feed Polymerization

Examples 1–3 and Control 1 show that molecular weight control is obtained in the absence of added α-methylstyrene. The products have structure 1 with an internal double bond and do not function as macromonomers.

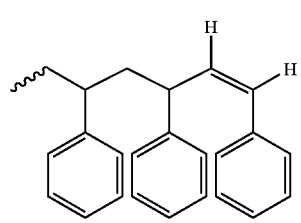

1

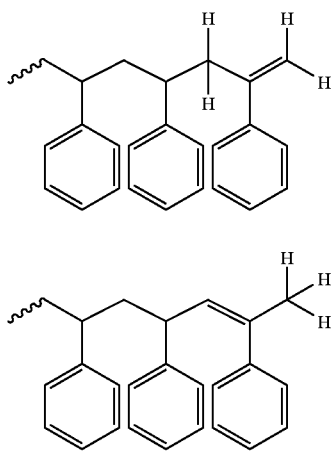

Solution polymerization of styrene with α-methylstyrene (10:1) and iPrCo(III)(DMG-BF$_2$)$_2$ isopropylcobalt(III) (DMG) (100 ppm) in n-butyl acetate at 125° C.

|  |  |  |
|---|---|---|
|  | n-butyl acetate | 20.04 g |
|  | styrene (sty) | 10.03 g |
|  | α-methylstyrene | 1.00 g |
| Shot: | iPrCo(III)(DMG-BF$_2$)$_2$ | 1.4 mg |
|  | n-butyl acetate | 5.00 g |
| Feed 1: | 1,1'-azobis(4-cyclohexanecarbonitrile) | 0.093 g |
| (0.063 mL/min | n-butyl acetate | 6.73 g |
| over 120 min) | iPrCo(III)(DMG-BF$_2$)$_2$ | 4.6 mg |
| Feed 2: | styrene | 13.57 g |
| (0.139 mL/min over 120 min) | α-methylstyrene | 1.57 g |

The butyl acetate was degassed in a 5 neck 250 mL reactor, equipped with condenser, stirrer, and N$_2$ purge. The monomers were added and degassed for a further 10 minutes. The reactor was heated to reflux (ca 125° C.) and the shot of iPrCo(III)(DMG-BF$_2$)$_2$/solvent added. The monomer and initiator feeds were started immediately. The reactor was sampled at regular intervals to monitor intermediate molecular weights (GPC, THF) and conversions ($^1$H NMR, CDCl$_3$). A sample of this low viscosity yellow liquid was precipitated into a twenty fold excess of methanol, and the macromonomer recovered as a fine white powder. $\overline{M}_n$ 1270, $\overline{M}_w/\overline{M}_n$ 1.43, 34% conversion. The precipitated samples were examined by $^1$H NMR (200 MHz, CDCl$_3$) to establish the nature of the chain ends.

The unsaturated end groups give rise to signals as follows: styryl end group internal double bond (1): δ6.1 —CH(Ph)—CH=CH—Ph; δ3.1 CH(Ph)—CH=CH—Ph. Alpha methyl styrene-(AMS)-derived terminal methylene double bond (2): δ4.8 1H and δ5.2 1H, —C(Ph)=CH$_2$ (the ratio of the signals at δ6.1 and δ4.8 was found to give the best estimate of terminal double bond content. Although this utilises a signal on the fringe of the broad aromatic resonance δ7.6–7.2, a series of comparisons of the $^1$H-NMR molecular weights calculated from the end groups with those obtained by GPC showed that this gave better results than the signal at δ3.1). This may be due to the internal double bond product being a mixture of (1) and (3).

TABLE 1.1

Polymerization of styrene in presence of AMS and iPrCo(III) (DMG-BF$_2$)$_2$ at 125° C.

| Example | Time (min) | [Co(III)] ppm | Sty: AMS | $\overline{M}_n$ | $\overline{M}_w$ | $\overline{M}_w/\overline{M}_n$ | Conv.[1] % | [2][2] % |
|---|---|---|---|---|---|---|---|---|
| 1 | 30 | 100 | — | 1050 | 2290 | 2.18 |  |  |
|  | 60 | 100 |  | 1150 | 2540 | 2.21 | 3 |  |
|  | 120 | 100 |  | 1100 | 2590 | 2.18 | 5 |  |
|  | ppt | 100 |  | 1630 |  | 1.69 |  | 0 |
| 2 | 60 | 50 | — | 2010 | 4150 | 2.06 | 3 |  |
|  | 120 | 50 |  | 1720 | 3980 | 2.30 | 5 |  |
|  | ppt | 50 |  | 1940 |  | 2.03 |  | 0 |
| 3 | 60 | 25 | — | 3270 | 11153 | 3.41 | 3 |  |
|  | 120 | 25 |  | 2710 | 9540 | 3.52 | 5 |  |
|  | ppt | 25 | — | 2750 |  | 3.26 |  | 0 |

| Example | Time (min) | [Co(III)] ppm | Sty: AMS | $\overline{M}_n$ | $\overline{M}_w$ | $\overline{M}_w/\overline{M}_n$ | Conv.[a] % | [2] %[b] |
|---|---|---|---|---|---|---|---|---|
| Control 1 | 60 | 0 | — | 32230 | 54760 | 1.70 | 2 |  |
|  | 120 | 0 |  | 33830 | 59450 | 1.76 | 4 |  |
|  | 180 | 0 |  | 38060 | 63750 | 1.68 | 5 |  |
|  | 240 | 0 |  | 39510 | 67150 | 1.70 | 6 |  |
|  | 300 | 0 |  | 37420 | 67630 | 1.81 | 7 |  |
|  | 360 | 0 |  | 39420 | 67070 | 1.70 | 8 | 0 |
| 4 | 30 | 100 | 10:1 | 730 | 1840 | 2.38 |  |  |
|  | 60 | 100 |  | 740 | 1670 | 2.25 | 1 |  |
|  | 120 | 100 |  | 690 | 1430 | 2.06 | 3 |  |
|  | ppt | 100 |  | 1270 |  | 1.43 |  | 32 |

TABLE 1.1-continued

Polymerization of styrene in presence of AMS and iPrCo(III) (DMG-BF$_2$)$_2$ at 125° C.

| | | | | | | | | |
|---|---|---|---|---|---|---|---|---|
| 5 | 60 | 50 | 10:1 | 1170 | 2540 | 2.17 | 2 | |
| | 120 | 50 | | 1040 | 2300 | 2.21 | 4 | |
| | ppt | 50 | | 1470 | | 1.80 | | 56 |
| 6 | 60 | 25 | 10:1 | 1370 | 2890 | 2.11 | 2 | |
| | 120 | 25 | | 1270 | 2690 | 2.11 | 3 | |
| | ppt | 25 | | 1660 | | 1.89 | | 65 |
| Control 2 | 20 | 0 | 10:1 | 19696 | 50460 | 2.56 | n.d | |
| | 40 | 0 | | 14860 | 37950 | 2.55 | n.d | |
| | 60 | 0 | | 17060 | 38890 | 2.28 | 1 | |
| | 120 | 0 | | 24430 | 42040 | 1.72 | 3 | |
| | 240 | | | 27440 | 51420 | 1.87 | 4 | |
| | 360 | 0 | | 29400 | 52930 | 1.80 | 6 | 0 |
| 7 | 60 | 100 | 5:1 | 380 | 930 | 2.45 | | |
| | 120 | 100 | | 140 | 870 | 2.10 | | |
| | ppt | 100 | | 1310 | | 1.83 | | — |
| 8 | 60 | 50 | 5:1 | 810 | 1670 | 2.06 | 1 | |
| | 120 | 50 | | 780 | 1530 | 1.96 | 2 | |
| | ppt | 50 | | 1180 | | 1.53 | | 68 |
| 9 | 60 | 25 | 5:1 | 1760 | 3480 | 1.98 | 2 | |
| | 120 | 25 | | 1640 | 3160 | 1.93 | 3 | |
| | ppt | 25 | | 2140 | | 1.60 | | 100 |
| Control 3 | 60 | 0 | 5:1 | 16740 | 32450 | 1.94 | | |
| | 120 | 0 | | 19540 | 35020 | 1.79 | | |
| | ppt | 0 | | 19570 | | 1.83 | | 0 |

[1]Determined by $^1$H NMR
[2]% 2, remainder is 1 and 3 estimated by $^1$H NMR

Examples 10–12

Synthesis of High Molecular Weight Styrene Macromonomers

AMS Comonomer

Feed Polymerization

These Examples were run according to the same procedure of Examples 1 through 3.

similar to those obtained in the feed polymerization experiments (refer Table 1.1).

A mixture of styrene (1.3 g, 12.5 mmol), α-methylstyrene (0.15 g, 1.27 mmol) (monomer ratio: 10/1), n-butyl acetate (3 g), VR®-110 (8.9×10$^{-5}$ g, 20 ppm) and iPrCo(III)(DMG-BF$_2$)$_2$ (for concentrations see Table 1.3) was placed in an ampoule and degassed by 4 freeze-thaw cycles. The ampoule was sealed and the mixture heated at 125° C. for 2 hours. The ampoule was cooled, opened and the reaction mixture reduced in vacuo to a residue which was analysed by $^1$H-nmr and GPC.

TABLE 1.2

Polymerization of styrene in presence of AMS and iPrCo(III)(DMG-BF$_2$)$_2$ at 125° C. Numbers in parenthesis indicate reaction times.

| Ex. | reaction time (h) | [Co(III)] (ppm) | Sty/AMS | $\overline{M}_n$ $^c$ | $\overline{M}_w/\overline{M}$ | % conv. | % terminal alkene |
|---|---|---|---|---|---|---|---|
| 10 | 2 | 8 | 5/1 | 7455 (120) | 2.4 | 14 | — |
| | | (0.13/0.37)$^3$ | | 9442 (ppt) | 1.95 | | >70$^5$ |
| 11$^4$ | 1 | 8 | 5/1 | 4648 (60) | 1.81 | 12 | — |
| | | (0.13/0.37)$^3$ | | 5160 (ppt) | 1.64 | | >70$^5$ |
| 12 | 2 | 13 | 5/1 | 2660 (120) | 1.87 | 20 | — |
| | | (0.25/0.75)$^3$ | | 3300 (ppt) | 1.63 | | >70$^5$ |

[3]amount, in mg, added in (shot/feed).
[4]rate of cobalt complex feed twice that for example 10.
[5]internal methylene was not visible in the $^1$H-nmr spectrum.

Examples 13–18, Control 4–6

Synthesis of Styrene Macromonomers

AMS Comonomer

Batch Polymerizations in Sealed Tube—Effect of Reaction Temperature

Batch polymerizations were conducted in sealed tubes to establish the effect of temperature on macromonomer purity (% 2). Molecular weights and macromonomer purities are

TABLE 1.3

Batch polymerization of styrene in presence of AMS and iPrCo(III)(DMG-BF$_2$)$_2$ at 125° C. with VR ®-110 initiator

| Example | Sty/AMS ratio | [Co(III)] ppm | $\overline{M}_n$ | $\overline{M}_w/\overline{M}_n$ | % conv | % terminal AMS |
|---|---|---|---|---|---|---|
| Control 4 | 10/1 | 0 | 64547 | 1.72 | 5–9 | — |
| Control 5 | 5/1 | 0 | 53498 | 1.77 | 4–7 | — |
| 13 | 10/1 | 100 | 445 | 1.61 | 1–4 | 36 |
| 14 | 10/1 | 50 | 751 | 1.76 | 4–6 | 39 |
| 15 | 10/1 | 25 | 1408 | 1.79 | 7–9 | 54 |

TABLE 1.4

Batch polymerization of styrene in presence of AMS and iPrCo(III)(DMG-BF$_2$)$_2$ at 80° C. with AIBN initiator.

| Example | Sty/AM ratio | [Co(III)] ppm | $\overline{M}_n$ | $\overline{M}_w/\overline{M}_n$ | % conv | % terminal AMS[6] |
|---|---|---|---|---|---|---|
| Control 6 | 10/1 | 0 | 32,600 | 1.97 | 4 | 0 |
| 16 | 10/1 | 100 | 660 | 1.30 | 5 | 22 |
| 17 | 10/1 | 50 | 1090 | 1.52 | 7 | 33 |
| 18 | 10/1 | 25 | 1456 | 1.63 | 7 | 45 |

[6]Calculated as [terminal AMS units]/[terminal AMS units + terminal Sty units] × 100. From $^1$NMR.

Examples 19–22, Control 7–9

Synthesis of Styrene Macromonomers

AMS Comonomer

Batch Polymerizations in Sealed Tube—Effect of Cobalt Complex

A mixture of styrene (1.0 g, 9.66 mmol), α-methylstyrene (0.12 g, 0.96 mmol) (monomer ratio: 10/1), n-butyl acetate (2 g), VR®-110 (3.12×10$^{-4}$ g, 100 ppm) and the cobalt species (for all experiments 50 ppm, 2.44×10$^{-7}$ mol of cobalt species was used) was placed in an ampoule and degassed by 4 freeze-thaw cycles. The ampoule was sealed and the mixture heated at 125° C. for 2 hours. The ampoule was cooled, opened and the reaction mixture reduced in vacuo to a residue which was analysed by $^1$H-nmr and GPC.

TABLE 1.5

Batch polymerization of styrene in presence of AMS and various cobalt complexes at 125° C. with VR ® 110 initiator.

| Example | Co species[7] | [Co] ppm | Mn | Mw | PD | % conv | % terminal AMS units[8] |
|---|---|---|---|---|---|---|---|
| Control 7 | Co(III)DMG | 0 | 58,288 | 104,916 | 1.8 | 13 | 0 |
| 19 | " | 50 | 1065 | 1730 | 1.62 | 19 | 71 |
| Control 8 | Co(III)DEG | 0 | 72,284 | 125,129 | 1.73 | 15 | 0 |
| 20 | " | 50 | 1388 | 2368 | 1.7 | 19 | 85 |
| Control 9 | Co(II)DPG | 0 | 71,869 | 122,098 | 1.7 | 12 | 0 |
| 21 | " | 50 | 1454 | 2532 | 1.74 | 23 | 91 |
| 22 | Co(III)DMG Feed Expt[9] | 50 | 1470 | — | 1.8 | 39 | 74 |

[7]Co(III)DMG = iPrCo(III)(DMG-BF$_2$)$_2$, Co(III)DEG = MeCo(III)(DEG-BF$_2$)$_2$, Co(III)DPG Co(II)(DPG-BF$_2$)$_2$.
[8]Calculated as [terminal AMS units]/[(terminal AMS units + terminal Sty units] × 100 from NMR.
[9]Data ex Table 1.1

Examples 23–24, Control 10

Synthesis of Styrene Macromonomers

Methacrylate Comonomer

Feed Polymerization

The polymerization recipe for examples 23–24 and their control was similar to that given for Examples 1–3 with the modification that BMA was used in place of AMS. Conversions obtained are similar. Good molecular weight control is observed however little specificity for formation of a terminal macromonomer double bond is observed.

TABLE 1.7

Polymerization of styrene in presence of BMA and iPrCo(III)(DMG-BF$_2$)$_2$ at 125° C. with 1,1'-azobis(4-cyclohexanecarbonitrile) as initiator

| Sample | Time (min) | [Co(III)] ppm | Sty:BMA[10] | $\overline{M}_n$[11] | $\overline{M}_w$ | $\overline{M}_w/\overline{M}_n$ | % Conv.[12] |
|---|---|---|---|---|---|---|---|
| Control 10 | 30 | 0 | 10:1 | 35870 | 60580 | 1.69 | 25 |
| | 60 | 0 | | 34970 | 58090 | 1.66 | 35 |
| | 120 | 0 | | 36360 | 61770 | 1.70 | 51 |
| | ppt | 0 | | 35750 | | 1.73 | |
| 23 | 30 | 100 | 10:1 | 1170 | 2130 | 1.81 | 20 |
| | 60 | 100 | | 1220 | 3410 | 1.82 | 37 |
| | 120 | 100 | | 1190 | 2230 | 1.88 | 51 |
| | ppt | 100 | | 1560 | | 1.69 | |
| 24 | 60 | 25 | 10:1 | 4800 | 9440 | 1.97 | 38 |
| | 120 | 25 | | 3750 | 8290 | 2.21 | 53 |
| | ppt | 25 | | 4190 | 8270 | 1.97 | |

[10]Molar ratio of comonomers
[11]Determined by GPC calibrated with narrow polydispersity polystyrene standards.
[12]Determined by $^1$H NMR Examples 25–30

Synthesis of Styrene Macromonomers

Isopropenyl Acetate Comonomer

Batch Polymerization

Sty/iPA macromonomer formation at 80° C.: A mixture of styrene (1 g, 9.6 mmol), isopropenyl acetate (0.19 g, 1.9 mmol) (monomer ratio: 5/1), n-butyl acetate (2 g), AIBN (3.19×10$^{-4}$ g, 100 ppm) and isopropylcobalt(III)DMG (for concentrations see Table 1.8) was placed in an ampoule and degassed by 4 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC.
$^1$H-nmr (d6-acetone): styryl end group internal double bond (1): δ6.1 —CH(Ph)—CH=CH—Ph; δ3.1 CH(Ph)—CH=CH—Ph.

TABLE 1.8

Sty/iPA macromonomer formation at 80° C. for 2 h with AIBN and iPrCo(III)(DMG-BF$_2$)$_2$.

| Example | Sty/iPA ratio | Co(III) ppm | Mn | Mw | PD | % conv | % terminal iPA units[13] |
|---|---|---|---|---|---|---|---|
| Control 11 | 5/1 | 0 | 57,425 | 91,753 | 1.6 | 6.00 | 0 |
| 25 | 5/1 | 400 | 338 | 364 | 1.07 | 4.00 | 0 |
| 26 | 5/1 | 100 | 698 | 1045 | 1.49 | 4.00 | 0 |
| 27 | 5/1 | 25 | 5188 | 11,611 | 2.24 | 6.00 | 0 |
| Control 12 | 1/1 | 0 | 32,782 | 52,987 | 1.61 | 3.00 | 0 |
| 28 | 1/1 | 400 | 323 | 343 | 1.07 | 2.00 | 0 |
| 29 | 1/1 | 100 | 465 | 586 | 1.26 | 3.00 | 0 |
| 30 | 1/1 | 25 | 1560 | 2825 | 1.81 | 3.00 | 0 |

[13]No terminal alkene derived from iPA were detectable by 1H NMR.

Examples 31–45, Controls 13–16
Synthesis of Butyl Acrylate Macromonomers

AMS Comonomer at 80° C.

Batch Polymerization—Effect of Comonomer and Complex Concentration

A mixture of butyl acrylate (1.3 g, 10 mmol), α-methylstyrene (50 mg, 0.4 mmol) (monomer ratio: 25/1), n-butyl acetate (2 g), AIBN (3.74×10$^{-4}$ g, 100 ppm) and isopropylcobalt(III)DMG (for concentration see Table 2.1) was placed in an ampoule and degassed by 4 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC.
$^1$H-nmr (d6-acetone): d 0.9, CH$_3$; 1.25, CH$_2$; 1.5, CH$_2$; 1.95, CH; 2.3, backbone CH$_2$; 2.55, allyl CH$_2$; 3.95, OCH$_2$; 5.0, vinyl H; 5.2, vinyl H; 7.15–7.25, ArH.

TABLE 2.1

Polymerization of butyl acrylate in presence of AMS and iPrCo(III)(DMG-BF$_2$)$_2$ at 80° C.

| Ex. | BA/AMS ratio | Co(III) ppm | $\overline{M}_n$[14] | PD | % Conv | % term. AMS units[15] | % AMS inc.[16] | % term. alkene[17] |
|---|---|---|---|---|---|---|---|---|
| Ctrl 13 | 5/1 | 0 | 23,500 | 1.75 | 3 | 0 | 39 | 0 |
| 31 | 5/1 | 100 | 475 | 1.20 | 3 | 64 | 43 | 100 |
| 32 | 5/1 | 50 | 487 | 1.20 | 4 | 60 | 38 | 100 |
| 33 | 5/1 | 25 | 495 | 1.20 | 4 | 54 | 41 | 100 |
| Ctrl 14 | 10/1 | 0 | 28,200 | 1.64 | 4 | 0 | 38 | 0 |
| 34 | 10/1 | 100 | 551 | 1.27 | 3 | 67 | 36 | 100 |
| 35 | 10/1 | 50 | 605 | 1.31 | 5 | 63 | 35 | 100 |
| 36 | 10/1 | 25 | 635 | 1.33 | 5 | 60 | 36 | 100 |
| Ctrl 15 | 25/1 | 0 | 41,423 | 1.69 | 9 | 0 | 17 | 0 |
| 37 | 25/1 | 200 | 943 | 1.37 | 5 | 92 | 15 | 91 |
| 38 | 25/1 | 100 | 961 | 1.39 | 5 | 77 | 17 | 96 |
| 39 | 25/1 | 50 | 1062 | 1.42 | 6 | 71 | 18 | 100 |
| 40 | 25/1 | 25 | 1152 | 1.48 | 7 | 57 | 20 | 100 |
| Ctrl 16 | 50/1 | 0 | 56,071 | 1.76 | 14 | 0 | 12 | 0 |
| 41 | 50/1 | 400 | 1168 | 1.64 | 10 | 78 | 9 | 80 |
| 42 | 50/1 | 200 | 1207 | 1.76 | 10 | 75 | 9 | 85 |
| 43 | 50/1 | 100 | 1481 | 1.80 | 13 | 61 | 9 | 91 |
| 44 | 50/1 | 50 | 1600 | 1.82 | 11 | 59 | 10 | 100 |
| 45 | 50/1 | 25 | 1876 | 1.96 | 11 | 45 | 10 | 100 |

[14]Polystyrene equivalents.
[15]Calculated as (terminal AMS units)/(total AMS units) × 100.
[16]Calculated as (total AMS units)/(total BA units + total AMS) × 100.
[17]Calculated as (terminal AMS units)/(terminal AMS units + terminal BA units) × 100.
A Value of 100% indicates that terminal BA could not be detected by $^1$H NMR.

Examples 46–54, Controls 17, 18,

Synthesis of Butyl Acrylate Macromonomers

AMS comonomer at 125° C.

Batch Polymerization—Effect of Reaction Temperature

A mixture of butyl acrylate (1.3 g, 10 mmol), α-methylstyrene (50 mg, 0.4 mmol) (monomer ratio: 25/1), n-butyl acetate (2 g), VR®-110 (3.74×10$^{-4}$ g, 100 ppm) and iPrCo(III)(DMG-BF$_2$)$_2$ (for concentration see Table 2.2) was placed in an ampoule and degassed by 4 freeze-thaw cycles. The ampoule was sealed and the mixture heated at 125° C. for 2 hours. The ampoule was cooled, opened and the reaction mixture reduced in vacuo to a residue which was analysed by $^1$H-nmr and GPC.

TABLE 2.2

Polymerization of butyl acrylate in presence of AMS and iPrCo(III)(DMG-BF$_2$)$_2$ at 125° C.

| Ex. | BA/AMS ratio | Co(III) ppm | $\overline{M}_n$ | PD | % conv | % term. AMS units[18] | % AMS inc.[19] | % terminal alkene[20] |
|---|---|---|---|---|---|---|---|---|
| Control 17 | 25/1 | 0 | 18,069 | 1.77 | 36 | 0 | 13 | 0 |
| 46 | 25/1 | 200 | 973 | 1.58 | 19 | 77 | 12 | 85 |
| 47 | 25/1 | 100 | 967 | 1.73 | 29 | 68 | 13 | 93 |
| 48 | 25/1 | 50 | 1402 | 1.68 | 32 | 57 | 13 | 100 |
| 49 | 25/1 | 25 | 2230 | 2.10 | 3 | 23 | 20 | 100 |
| Control 18 | 50/1 | 0 | 18,891 | 1.85 | 6 | 0 | 5 | 0 |
| 50 | 50/1 | 400 | 1069 | 1.65 | 21 | 84 | 6 | not calc. |
| 51 | 50/1 | 200 | 1200 | 1.72 | 21 | 72 | 7 | 73 |
| 52 | 50/1 | 100 | 1624 | 1.81 | 30 | 58 | 6 | 77 |
| 53 | 50/1 | 50 | 1948 | 1.92 | 32 | 55 | 6 | 87 |
| 54 | 50/1 | 25 | 3463 | 2.10 | 43 | 32 | 5 | 100 |

[18]Calculated as (terminal AMS units)/(total AMS units) × 100.
[19]Calculated as (total AMS units)/(total BA units + total AMS) × 100.
[20]Calculated as (terminal AMS units)/(terminal AMS units + terminal BA units) × 100.

Examples 55–58, Control 19

Synthesis of Butyl Acrylate Macromonomers

AMS Comonomer at 80° C.

Batch Polymerization—Effect of Cobalt Complex

A mixture of butyl acrylate (1.3 g, 10 mmol), α-methylstyrene (24 mg, 0.2 mmol) (monomer ratio: 50/1), n-butyl acetate (2 g), AIBN (3.74×10$^{-4}$ g, 100 ppm) and MeCo(III)(DEG-BF$_2$)$_2$ (for concentration see table 2.3) was placed in an ampoule and degassed by 4 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC.

Examples 64–68, Control 21

Synthesis of Butyl Acrylate Macromonomers

MAN Comonomer at 80° C.—Batch Polymerization

A mixture of butyl acrylate (1 g, 7.58 mmol), methacrylonitrile (51 mg, 0.758 mmol), n-butyl acetate (2 g), AIBN (3.54×10$^{-4}$ g, 100 ppm) and iPrCo(III)(DMG-BF$_2$)$_2$ (for concentration see Table 2.5) was placed in an ampoule and degassed by 4 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC. $^1$H-nmr (CDCl$_3$): d 0.95, CH$_3$; 1.35, CH$_2$; 1.65, CH$_2$; 1.95, CH; 2.3, backbone CH$_2$; 2.6, allyl CH$_2$; 4.0, OCH$_2$; 5.7, vinyl H; 5.85, vinyl H.

TABLE 2.3

Polymerization of butyl acrylate in presence of AMS and MeCo(III)(DEG-BF$_2$)$_2$ at 80° C.

| Ex. | BA/AMS ratio | Co(III) ppm | $\overline{M}_n$ | PD | % conv | % term. AMS units[21] | % AMS inc.[22] | % terminal alkene[23] |
|---|---|---|---|---|---|---|---|---|
| Control 19 | 50/1 | 0 | 49,342 | 1.74 | 11 | 0 | 25 | 0 |
| 55 | 50/1 | 200 | 1128 | 1.57 | 4 | 79 | 12 | 100 |
| 56 | 50/1 | 100 | 1162 | 1.66 | 5 | 75 | 12 | 100 |
| 57 | 50/1 | 50 | 1647 | 1.70 | 10 | 57 | 12 | 100 |
| 58 | 50/1 | 25 | 2369 | 1.85 | 11 | 31 | 13 | 100 |

[21]Calculated as (terminal AMS units)/(total AMS units) × 100.
[22]Calculated as (total AMS units)/(total BA units + total AMS) × 100.
[23]Calulated as (terminal AMS units)/(terminal AMS units + terminal BA units) × 100.

Examples 59–63, Control 20

BA/AMS Macromonomer Formation at 80° C. With Co(II)(DPG-BF$_2$)$_2$

A mixture of butyl acrylate (1.3 g, 10 mmol), α-methylstyrene (24 mg, 0.2 mmol) (monomer ratio: 50/1), n-butyl acetate (2 g), AIBN (3.74×10$^{-4}$ g, 100 ppm) and Co(II)(DPG-BF$_2$)$_2$ (for concentrations see Table 2.4) was placed in an ampoule and degassed by 4 freeze-thaw cycles. The ampoule was sealed and the mixture heated at 80° C. for 2 hours. The ampoule was cooled, opened and the reaction mixture reduced under vacuum to a residue which was analysed by $^1$H-nmr and GPC.

TABLE 2.4

Polymerization of butyl acrylate in presence of AMS (50/1) and Co(II)(DPG-BF$_2$)$_2$ at 80° C.

| Ex. | Co(II) ppm | $\overline{M}_n$ | $\overline{M}_w$ | PD | % conv | % term. AMS units[24] | % AMS inc.[25] | % terminal alkene[26] |
|---|---|---|---|---|---|---|---|---|
| Control 20 | 0 | 50,575 | 104,679 | 2.07 | 17 | 0 | 9 | 0 |
| 59 | 400 | 796 | 1262 | 1.58 | 1 | 79 | 11 | 89 |
| 60 | 200 | 864 | 1419 | 1.64 | 1 | 73 | 12 | 100 |
| 61 | 100 | 1064 | 1817 | 1.71 | 1 | 66 | 13 | 100 |
| 62 | 50 | 1126 | 1957 | 1.73 | 1 | 60 | 14 | 100 |
| 63 | 25 | 2076 | 5407 | 2.10 | 3 | 35 | 13 | 100 |

[24]Calculated as (terminal AMS units)/(total AMS units) × 100.
[25]Calculated as (total AMS units)/(total BA units + total AMS) × 100.
[26]Calculated as (terminal AMS units)/(terminal AMS units + terminal BA units) × 100.

TABLE 2.5

Polymerization of butyl acrylate in presence of MAN and iPrCo(III)(DMG-BF$_2$)$_2$ at 80° C.

| Ex. | BA/MAN Ratio | [Co(III)] ppm | $\overline{M}_n$ | $\overline{M}_w$ | PD | % conv. | % terminal methylene[27] |
|---|---|---|---|---|---|---|---|
| Control 21 | 10/1 | 0 | 9306 | 17,653 | 1.90 | 8 | 0 |
| 64 | 10/1 | 400 | 669 | 1004 | 1.50 | 6 | 86 |
| 65 | 10/1 | 200 | 802 | 1179 | 1.47 | 7 | 87 |
| 66 | 10/1 | 100 | 959 | 1432 | 1.49 | 8 | 80 |
| 67 | 10/1 | 50 | 1036 | 1676 | 1.62 | 8 | 76 |
| 68 | 10/1 | 25 | 1301 | 2008 | 1.54 | 8 | 81 |

[27]Calculated as (terminal MAN units)/(terminal MAN units + terminal BA units) × 100.

Examples 69–83, Controls 22 to 24

Synthesis of Butyl Acrylate Macromonomers

MMA Comonomer at 60–125° C.—Batch Polymerization

BA/MMA Macromonomer Formation at BA/MMA 10/1

A mixture of butyl acrylate (1 g, 7.58 mmol), methyl methacrylate (76 mg, 0.758 mmol), n-butyl acetate (2 g), initiator (see Table 2.6 for initiator type) and isopropylcobalt (III)DMG (for concentration see Table 2.6) was placed in an ampoule and degassed by 4 freeze-thaw cycles. The ampoule was sealed and the mixture heated at the indicated temperature for either 2 or 3 hours. The ampoule was rapidly cooled, opened and the reaction mixture reduced in vacuo to a residue which was analysed by $^1$H-nmr and GPC.

$^1$H-nmr (CDCl$_3$): d 0.9, CH$_3$; 1.35, CH$_2$; 1.65, CH$_2$; 1.85, CH: 2.25, backbone CH$_2$; 2.55, allyl CH$_2$; 3.6, OCH$_3$; 4.0, OCH$_2$; 5.5, vinyl H; 6.15, vinyl H.

Examples 84–91, Control 25 and 26

Synthesis of Functional Butyl Acrylate Macromonomers

HEMA Comonomer at 80° C.—Batch Polymerization

A mixture of butyl acrylate (1.3 g; 10 mmol), 2-hydroxyethyl methacrylate, HEMA (65 mg; 0.5 mmol) (monomer ratio 20:1), n-butyl acetate (2 g), AIBN (3.74× 10-4 g, 100 ppm) and isopropylcobalt(III)DMG (for concentration see Table 2.7) was placed in an ampoule and degassed by 4 freeze-thaw cycles. The ampoule was sealed and the mixture heated at 80° C. for 1 or 2 hours. The ampoule was cooled, opened and the reaction mixture reduced in vacuo to a residue which was analysed by $^1$H-nmr and GPC.

$^1$H-nmr (CDCl$_3$): d 0.95, CH$_3$; 1.40, CH$_2$; 1.65, CH$_2$; 1.85, backbone CH; 2.25, backbone CH$_2$; 3.80, CH$_2$; 4.00, CH$_2$; 4.22, CH$_2$; 5.50, external vinyl*; 5.80, 5.90, E&Z internal vinyl*; 6.20, external vinyl*. (*external vinyl signals due to HEMA derived vinyl end group and internal vinyl signals due to BA derived vinyl group).

TABLE 2.6

Polymerization of butyl acrylate in presence of MMA (10:1) and iPrCo(III)(DMG-BF$_2$)$_2$ at various temperatures

| Ex. | Temp ° C. (initiator) | React. Time h | Co(III) ppm | $\overline{M}_n$ | PD | % conv | % term. alkene[28] | % MMA incorp.[29]2 | $\overline{M}_n$ cal/ob |
|---|---|---|---|---|---|---|---|---|---|
| Ctrl 22 | (AIBN) | 3 | 0 | 170,754 | 2.08 | 25 | 0 | 19 | — |
| 69 | 60 | 3 | 400 | 891 | 1.55 | 6 | 83 | 18 | 1.04 |
| 70 | 60 | 3 | 200 | 1051 | 1.56 | 5 | 87 | 19 | 1.05 |
| 71 | 60 | 3 | 100 | 1567 | 1.70 | 4 | 91 | 20 | 0.83 |
| 72 | 60 | 3 | 50 | 2610 | 1.80 | 7 | 100 | 19 | 0.98 |
| 73 | 60 | 3 | 25 | 7702 | 1.87 | 16 | 100 | 18 | 1.0 |
| Ctrl 23 | (AIBN) | 2 | 0 | 75,501 | 2.08 | 54 | 0 | 14 | — |
| 74 | 80 | 2 | 400 | 917 | 1.31 | 8 | 75 | 17 | 0.92 |
| 75 | 80 | 2 | 200 | 1196 | 1.43 | 10 | 86 | 17 | 0.93 |
| 76 | 80 | 2 | 100 | 1520 | 1.50 | 9 | 92 | 18 | 0.92 |
| 77 | 80 | 2 | 50 | 2602 | 1.66 | 21 | 94 | 17 | 1.00 |
| 78 | 80 | 2 | 25 | 12,117 | 1.82 | 53 | 100 | 14 | 1.09 |
| Ctrl 24 | (VR ®-110) | 2 | 0 | 10,410 | 2.56 | 76 | 0 | 11 | — |
| 79 | 125 | 2 | 400 | 832 | 1.51 | 9 | 79 | 16 | 1.04 |
| 80 | 125 | 2 | 200 | 1032 | 1.73 | 15 | 87 | 17 | 1.00 |
| 81 | 125 | 2 | 100 | 1224 | 1.60 | 14 | 91 | 17 | 1.05 |
| 82 | 125 | 2 | 50 | 1994 | 1.70 | 32 | 92 | 15 | 1.01 |
| 83 | 125 | 2 | 25 | 3513 | 1.74 | 45 | 93 | 14 | 0.88 |

[28]Calculated as (terminal MMA units)/(terminal MMA units + terminal BA units) × 100.
[29]Calculated as (total MMA units)/(total MMA units + total BA units) × 100.

TABLE 2.7

Polymerization of butyl acrylate in presence of HEMA (20:1) and iPrCo(III)(DMG-BF$_2$)$_2$ at 80° C.

| Example | Reaction Time (hours) | Co(III) ppm | M$_n$ | M$_w$ | PD | % conv | % terminal alkene[30] |
|---|---|---|---|---|---|---|---|
| Control 25 | 1 | 0 | 169,846 | 403,699 | 2.38 | 53 | 0 |
| 84 | 1 | 200 | 1695 | 3011 | 1.78 | 6 | 80 |
| 85 | 1 | 50 | 12,919 | 25,390 | 1.97 | 23 | 100 |
| 86 | 1 | 25 | 35,421 | 68,294 | 1.93 | 37 | 100 |
| Control 26 | 2 | 0 | 58,522 | 200,100 | 3.42 | 98 | 0 |
| 87 | 2 | 400 | 1116 | 2144 | 1.92 | 13 | 71 |
| 88 | 2 | 200 | 1545 | 3207 | 2.08 | 19 | 73 |
| 89 | 2 | 100 | 2219 | 5215 | 2.35 | 24 | 78 |
| 90 | 2 | 50 | 21,852 | 46,133 | 2.11 | 79 | a |
| 91 | 2 | 25 | 38,369 | 95,492 | 2.49 | 97 | a |

[a]Terminal alkene protons were not visible in $^1$H-nmr spectrum.
[30]Calculated as (terminal HEMA units)/(terminal HEMA units + terminal BA units) × 100.

Examples 92–94, Control 27

Synthesis of Functional Acrylate Copolymer Macromonomers

AMS Comonomer at 80° C.—Batch Polymerization

A mixture of butyl acrylate (1.3 g; 10 mmol), 2-hydroxyethylacrylate, HEA (116 mg; 1 mmol), α-methylstyrene (26 mg; 2.2×10$^{-4}$ mol) (monomer ratio 10/1/0.22), n-butyl acetate (2 g), AIBN (3.65×10$^{-4}$ g, 100 ppm) and isopropylcobalt(III)DMG (for concentration see Table 2.8) was placed in an ampoule and degassed by 4 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC.

$^1$H-nmr(CDCl$_3$): d 0.90, CH$_3$; 1.30, CH$_2$; 1.50, CH$_2$; 1.80, backbone CH; 2.22, backbone CH$_2$; 3.80, CH$_2$; 3.85, CH2; 4.98, external vinyl*; 5.20, external vinyl*; 5.80, 5.85, internal vinyl*; 6.60–7.00, internal vinyl*; 7.30, ArH. (*external vinyl signals due to AMS derived vinyl end group and internal vinyl signals due to BA derived vinyl group).

TABLE 2.8

Copolymerization of butyl acrylate and hydroxyethyl acrylate in presence of AMS and iPrCo(III)(DMG-BF$_2$)$_2$ at 80° C.

| Example | BA/HEA/ AMS ratio | Co(III) ppm | M$_n$ | PD (Mw/Mn) | % conv | % terminal AMS units[31] | % AMS inc.[32] | % terminal alkene[33] |
|---|---|---|---|---|---|---|---|---|
| Control 27 | 10/1/0.22 | 0 | 66,642 | 1.96 | 30 | 0 | 9 | 0 |
| 92 | 10/1/0.22 | 200 | 1255 | 1.55 | 16 | 72 | 10 | 78 |
| 93 | 10/1/0.22 | 100 | 1712 | 1.76 | 22 | 19 | 8 | 100 |
| 94 | 10/1/0.22 | 50 | 1835 | 1.80 | 22 | 49 | 10 | 100 |

[31]Calculated as (terminal AMS units)/(total AMS units) × 100.
[32]Calculated as (total AMS units)/(total BA + total HEA units) × 100.
[33]Calculated as (terminal AMS units)/(terminal AMS units + terminal BA units) × 100.

Examples 95–100, Controls 28 and 29
Synthesis of Vinyl Benzoate Macromonomers
BMA Comonomer at 80° C.—Batch Polymerization A mixture of vinyl benzoate, VB (1.3 g, 8.77 mmol), butyl methacrylate (0.125 g, 0.877 mmol) (monomer ratio: 10/1), n-butyl acetate (3 g), AIBN (4.43×10$^{-4}$ g, 100 ppm) and isopropylcobalt(III)DMG (for concentration see Table 3.1) was placed in an ampoule and degassed by 4 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC.

$^1$H-nmr (d6-acetone): δ 0.9, CH$_3$; 1.35, CH$_2$; 1.65, CH$_2$; 1.95, CH; 2.25, backbone CH$_2$; 2.55, allyl CH$_2$; 4.0, OCH$_2$; 5.2, CH; 5.45, vinyl H; 6.15, vinyl H; 6.9–7.7, ArH.

TABLE 3.1

Polymerization of vinyl benzoate in presence of BMA and iPrCo(III)(DMG-BF$_2$)$_2$ at 80° C.

| Example | VB/BMA ratio | [Co(III)] ppm | $\overline{M}_n$ | $\overline{M}_w$ | PD | % conv. | % terminal methylene[34] |
|---|---|---|---|---|---|---|---|
| Control 28 | 10/1 | 0 | 67,070 | 106,547 | 1.59 | 12 | 0 |
| 95 | 10/1 | 100 | 3168 | 4942 | 1.56 | 5 | 87 |
| 96 | 10/1 | 50 | 6679 | 12,475 | 1.87 | 7 | 85 |
| 97 | 10/1 | 25 | 12,344 | 24,349 | 1.97 | 8 | 63 |
| Control 29 | 5/1 | 0 | 86,701 | 137,600 | 1.58 | 19 | 0 |
| 98 | 5/1 | 100 | 1720 | 2526 | 1.47 | 8 | 100 |
| 99 | 5/1 | 50 | 3464 | 6151 | 1.76 | 7 | 100 |
| 100 | 5/1 | 25 | 9094 | 16,155 | 1.78 | 9 | 86 |

[a]Calculated as (terminal BMA units)/(terminal BMA units + terminal VB units) × 100.
[34]Calculated as (terminal BMA units)/(terminal BMA units + terminal VB units) × 100.

Examples 101–108, Controls 30 and 31

Synthesis of Vinyl Acetate Macromonomers Methacrylate

Butyl Methacrylate Comonomers at 80° C.—Batch Polymerization

VAc/BMA Macromonomer Synthesis with Monomer Ratio of 10/1

A mixture of vinyl acetate (1 g; 11.6 mmol), butyl methacrylate (0.165 g; 1.16 mmol) (monomer ratio: 10/1), n-butyl acetate (2 g), AIBN (3.17×10$^{-4}$ g, 100 ppm) and isopropylcobalt(III)DMG (for concentration see Table 3.2) was placed in an ampoule and degassed by 3 freeze-thaw cycles. The ampoule was sealed and the mixture heated at 80°C. for 2 hours. The ampoule was cooled, opened and the reaction mixture reduced in vacuo to a residue which was analysed by $^1$H-nmr and GPC.

$^1$H-nmr(CDCl$_3$): d 0.95, CH$_3$; 1.30, CH$_2$; 1.60, CH$_2$; 3.90, CH$_2$; 5.40, 6.10, external vinyl CH$_2$*. (*external vinyl signals due to BMA derived vinyl end group).

TABLE 3.2

Polymerization of vinyl acetate in presence of BMA and iPrCo(III)(DMG-BF$_2$)$_2$ at 80° C. (VAc:BMA = 10:1)

| Example | Co(III) ppm | $\overline{M}_n$ | PD | % conv | % BMA terminal[35] | BMA[36] (%) | % term. alkene[37] | $\overline{M}_n$ calc/obs |
|---|---|---|---|---|---|---|---|---|
| Control 30 | 0 | 62,363 | 1.78 | 10 | 0 | 67 | 0 | 0 |
| 101 | 400 | 499 | 1.40 | 5 | 33 | 80 | 100 | 0.9 |
| 102 | 200 | 1917 | 1.37 | 6 | 16 | 69 | 100 | 0.55 |
| 103 | 100 | 2127 | 2.3 | 7 | 7 | 72 | 100 | 1.02 |
| 104 | 50 | 4435 | 3.0 | 7 | 4 | 73 | 100 | 1.03 |
| 105 | 25 | 10,331 | 2.88 | 10 | 1 | 71 | 100 | 1.3 |

[35]Calculated as [terminal BMA units]/[total BMA units incorporated] × 100.
[36]Calculated as (total BMA units)/(total VAc units + total BMA units) × 100.
[37]VAc derived internal alkene not detectable by $^1$H-nmr.

VAc/MMA Macromonomer Synthesis with Monomer Ratio of 5/1

A mixture of vinyl acetate (0.75 g; 8.77 mol), methyl methacrylate (0.175 g; 1.75 mmol) (monomer ratio: 5/1), n-butyl acetate (2 g), AIBN (2.93×10$^{-4}$ g, 100 ppm) and isopropylcobalt(III)DMG (for concentration see Table 3.3) was placed in an ampoule and degassed by 3 freeze-thaw cycles. The ampoule was sealed and the mixture heated at 80° C. for 2 hours. The ampoule was cooled, opened and the reaction mixture reduced in vacuo to a residue which was analysed by $^1$H-nmr and GPC.

$^1$H-nmr (d$_6$-acetone): δ 0.6–2.1, CH$_3$CO$_2$ and backbone CH$_2$; 3.60, COOCH$_3$; 4.80–5.30, multiplet, various methine signals; 5.42, 6.10 external vinyl CH$_2$*. (*external vinyl signal due to MMA derived vinyl end group).

TABLE 3.3

Polymerization of vinyl acetate in presence of MMA and iPrCo(III)(DMG-BF$_2$)$_2$ at 80° C. (VAc:MMA = 5:1)

| Example | Co(III) ppm | $\overline{M}_n$ | PD | % conv | % MMA terminal[38] | % MMA inc.[39] | % term. alkene[40] | $\overline{M}_n$ calc/obs |
|---|---|---|---|---|---|---|---|---|
| Control 31 | 0 | 40,448 | 1.87 | 8 | 0 | 87 | 0 | — |
| 106 | 100 | 11,806 | 2.26 | 5 | 0.9 | 87 | 100 | 1.0 |
| 107 | 50 | 12,487 | 2.38 | 8 | 0.8 | 88 | 100 | 1.06 |
| 108 | 25 | 30,782 | 1.92 | 8 | 0[41] | 87 | 0[41] | — |

[38]Calculated as (terminal MMA units )/(total MMA units incorporated) × 100.
[39]Calculated as (total MMA units)/(total VAc units + total MMA units) × 100.
[40]Calculated as (terminal MMA units)/(terminal VAc units + terminal MMA units) × 100. VAc derived internal alkene not detectable by $^1$H-nmr.
[41]Terminal vinyl signals could not be detected by $^1$H-nmr.

Examples 109–116, Controls 32 and 33

Synthesis of Vinyl Acetate Macromonomers

Isopropenyl Acetate, iPA Comonomer at 125° C.— Batch Polymerization

A mixture of vinyl acetate (1.0 g; 11.6 mmol), isopropenyl acetate (23 mg; 0.232 mmol) (monomer ratio: 50/1), n-butyl acetate (2 g), VR®-110 (3.4×10$^{-4}$ g, 100 ppm) and isopropylcobalt(III)DMG (for concentration see Table 3.4) was placed in an ampoule and degassed by 3 freeze-thaw cycles. The ampoule was sealed and the mixture heated at 125° C. for 2 hours. The ampoule was cooled, opened and the reaction mixture reduced in vacuo to a residue which was analysed by $^1$H-nmr and GPC.

$^1$H-nmr (CDCl$_3$): d 1.2–2.1, CH$_2$ +CH$_3$CO; 4.7–5.2, multiplet, various backbone methine.

TABLE 3.4

Polymerization of vinyl acetate in presence of iPA and iPrCo(III)(DMG-BF$_2$)$_2$ at 125° C.

| Example | Vac/iPA ratio | Co(III) ppm | $M_n$ | $M_w$ | PD | % conv | % term. iPA |
|---|---|---|---|---|---|---|---|
| Control 32 | 5/1 | 0 | 11,964 | 21,818 | 1.82 | 47 | 0 |
| 109 | 5/1 | 200 | 502 | 983 | 1.40 | 2 | b |
| 110 | 5/1 | 100 | 696 | 1124 | 1.61 | 2 | b |
| 111 | 5/1 | 50 | 1240 | 2278 | 1.84 | 2 | b |
| 112 | 5/1 | 25 | z4781 | 11,189 | 2.34 | 9 | b |
| Control 33 | 50/1 | 0 | 15,271 | 29,423 | 1.93 | 90 | 0 |
| 113 | 50/1 | 200 | 772 | 1329 | 1.72 | 2 | a |
| 114 | 50/1 | 100 | 1295 | 2517 | 1.94 | 3 | a |
| 115 | 50/1 | 50 | 2353 | 6484 | 2.76 | 5 | b |
| 116 | 50/1 | 25 | 13,518 | 23,737 | 1.76 | 16 | b | a end group signals observed but reliable quantitation not possible.
b no end group signals detected.

Examples 117–128, Controls 34 to 36

Synthesis of Vinyl Acetate Macromonomers

Isopropenyl Chloride Comonomer at 125° C.— Batch Polymerization
VAc/iPrCl macromonomer formation at 125° C. with VR®-110 and iPrCo(III)(DMG-BF$_2$)$_2$ A mixture of vinyl acetate (1 g, 11.6 mmol), isopropenyl chloride (0.18 g, 2.32 mmol) (monomer ratio: 5/1), n-butyl acetate (2 g), VR®-110 (3.18×10$^{-4}$ g, 100 ppm) and iPrCo(III)(DMG-BF$_2$)$_2$ (for concentration see table 3.5) was placed in an ampoule and degassed by 4 freeze-thaw cycles. The ampoule was sealed and the mixture heated at 125° C. for 2 hours. The ampoule was cooled, opened and the reaction mixture reduced in vacuo to a residue which was analysed by $^1$H-nmr and GPC.

TABLE 3.5

Polymerization of vinyl acetate in presence of iPCl and iPrCo(III)(DMG-BF$_2$)$_2$ at 125° C.

| Example | VAc/iPrCl | Co(III) ppm | $M_n$ | $M_w$ | PD | % conv |
|---|---|---|---|---|---|---|
| Control 34 | 5/1 | 0 | 3969 | 7475 | 1.88 | 3 |
| 117 | 5/1 | 200 | 350 | 434 | 1.24 | 1 |
| 118 | 5/1 | 100 | 552 | 1323 | 2.40 | <1 |
| 119 | 5/1 | 50 | 1355 | 3833 | 2.82 | 1 |
| 120 | 5/1 | 25 | 1791 | 5143 | 2.87 | <1 |

TABLE 3.5-continued

Polymerization of vinyl acetate in presence of iPCl and iPrCo(III)(DMG-BF$_2$)$_2$ at 125° C.

| Example | VAc/iPrCl | Co(III) ppm | $M_n$ | $M_w$ | PD | % conv |
|---|---|---|---|---|---|---|
| Control 35 | 50/1 | 0 | 15,712 | 27,346 | 1.74 | 14 |
| 121 | 50/1 | 200 | 717 | 973 | 1.35 | <1 |
| 122 | 50/1 | 100 | 1230 | 1843 | 1.49 | <1 |

TABLE 3.5-continued

Polymerization of vinyl acetate in presence of iPCl and iPrCo(III)(DMG-BF$_2$)$_2$ at 125° C.

| Example | VAc/iPrCl | Co(III) ppm | M$_n$ | M$_w$ | PD | % conv |
|---|---|---|---|---|---|---|
| 123 | 50/1 | 50 | 2692 | 4594 | 1.71 | 1 |
| 124 | 50/1 | 25 | 12,243 | 21,771 | 1.78 | 8 |

VAc/iPrCl Macromonomer Formation at 125° C. with VR®-110 and MRCo(III)(DEG-BF$_2$)$_2$ A mixture of vinyl acetate (1 g, 11.6 mmol), isopropenyl chloride (18 mg, 0.232 mmol) (monomer ratio: 50/1), n-butyl acetate (2 g), VR®-110 (3.15×10$^{-4}$ g, 100 ppm) and MeCo(III)(DEG-BF$_2$)$_2$ (for concentration see table 3.6) was placed in an ampoule and degassed by 4 freeze-thaw cycles. The ampoule was sealed and the mixture heated at 125® for 2 hours. The ampoule was cooled, opened and the reaction mixture reduced in vacuo to a residue which was analysed by GPC.

TABLE 3.6

Polymerization of vinyl acetate in presence of iPCl and MeCo(III)(DEG-BF$_2$)$_2$ at 125° C.

| Example | VAc/iPrCl ratio | Co(III) ppm | M$_n$ | M$_w$ | PD | % conv |
|---|---|---|---|---|---|---|
| Control 36 | 50/1 | 0 | 13,984 | 24,811 | 1.77 | 46 |
| 125 | 50/1 | 200 | 935 | 1502 | 1.60 | <1 |
| 126 | 50/1 | 100 | 1627 | 3001 | 1.84 | 1 |
| 127 | 50/1 | 50 | 10,605 | 19,522 | 1.84 | 6 |
| 128 | 50/1 | 25 | 12,740 | 22,831 | 1.79 | 10 |

Examples 129–132, Control 37

Synthesis of Functional Styrene Macromonomer

TMI®-Cytec Incorporated Comonomer

Feed Polymerization

A mixture of styrene (1 g, 9.6 mmol), TMI® (0.2 g, 0.96 mmol) (monomer ratio: 10/1), n-butyl acetate (2 g), VR®-110 (3.2×10$^{-4}$ g, 100 ppm) and isopropylcobalt(III)DMG (at 0, 25, 50, 100 and 200 ppm) was placed in an ampoule and degassed by 4 freeze-thaw cycles. The ampoule was sealed and the mixture heated at 125° C. for 2 hours. The ampoule was cooled, opened and the reaction mixture reduced in vacuo to a residue which was analysed by $^1$H-nmr and GPC.

$^1$H-nmr(d$_6$-acetone): δ 4.9, external vinyl*; 5.20, external vinyl*; 6.0–6.2, internal vinyl*; 6.6–7.4, ArH. (*external vinyl signals due to TMI® derived vinyl end group and internal vinyl signals due to Sty derived vinyl end group).

TABLE 4.1

Polymerization of styrene in presence of TMI® and iPrCo(III)(DMG-BF$_2$)$_2$ at 125° C.

| Example | Sty/ TMI® ratio | Co(III) ppm | M$_n$ | M$_w$ | PD | % terminal TMI® units[42] |
|---|---|---|---|---|---|---|
| Control 37 | 10/1 | 0 | 85,912 | 133,091 | 1.67 | 0 |
| 129 | 10/1 | 200 | 475 | 602 | 1.27 | 47 |
| 130 | 10/1 | 100 | 640 | 903 | 1.41 | 53 |
| 131 | 10/1 | 50 | 887 | 1373 | 1.55 | 60 |
| 132 | 10/1 | 25 | 1274 | 2155 | 1.73 | 75 |

[42]Calculated as (terminal TMI units)/(terminal TMI units + terminal Sty units).

Example 133

A mixture of 2.5 mL MA, 0.5 mL 2-chloro-2-propenol, 14 mg TAPCo, 20 mg VAZO-88 and 5 mL chloroform was degassed by three freeze-pump-thaw cycles. The reaction mixture was kept at 90° C. until 10–15% conversion was attained. GPC analysis showed Mn≈2150, PD=2.0.

Example 134

A mixture of 2.5 mL MA, 0.5 mL ethyl 2-hydroxymethylacrylate, 14 mg TAPCo, 20 mg VAZO-88 and 5 mL chloroform was degassed by three freeze-pump-thaw cycles. The reaction mixture was kept at 90° C. until 10–15% conversion was attained. GPC analysis showed Mn≈1600, PD=3.2.

Example 135

A mixture of 2.5 mL MA, 0.5 mL styrene, 14 mg TAPCo, 20 mg VAZO-88 and 5 mL chloroform was degassed by three freeze-pump-thaw cycles. The reaction mixture was kept at 90° C. until 10–15% conversion was attained. GPC analysis showed Mn≈700, PD=2.4.

Example 136

A mixture of 2.5 mL MA, 0.5 mL 2-hydroxyethyl methacrylate, 14 mg TAPCo, 20 mg VAZO-88 and 5 mL chloroform was degassed by three freeze-pump-thaw cycles. The reaction mixture was kept at 90° C. until 10–15% conversion was attained. GPC analysis showed Mn≈2150, PD=2.0.

Control 38

A mixture of 2.5 mL MA, 14 mg TAPCo, 20 mg VAZO®-88 and 5 mL chloroform was degassed by three freeze-pump-thaw cycles. The reaction mixture was kept at 90° C. until 10–15% conversion was attained. GPC analysis showns Mn≈21,700, PD=2.4.

Example 137

High Conversion Copolymerization of BA and MMA to Branched and Hyperbranched Polymers The reincorporation of initially-formed macromonomers back into the growing polymer is demonstrated.

Identical solutions of 32 mg of VAZO®-88 and 4 mg Co(II)(DPG-BF$_2$)$_2$ in 7.7 mL of butyl acrylate (BA), 1.5 mL MMA and 8 mL of 1,2-dichloroethane were degassed and kept in a 90° C. oil bath. The samples were removed from the temperature bath at various times shown in Table 5.1. Then each reaction mixture was chilled and evaporated in high vacuum till constant weight. The results, shown in Table 5.1, indicates that MW increases sharply at the end of the polymerization process. Because most of the monomer had been consumed before the increase in molecular weight, the only way that it could occur is through reincorporation of the macromonomers formed at the beginning of the reaction. GPC and K+IDS data are consistent.

TABLE 5.1

| Conversion | $M_n$ | $M_n/M_w$ |
|---|---|---|
| 12% | 540 | 2.08 |
| 20% | 640 | 2.08 |
| 55% | 890 | 2.06 |
| 93% | 2270 | 2.84 |

The catalyst remained active during the course of the polymerization. Sudden inactivation of the catalyst at conversion >60% cannot account for an increase of the Mn from 890 at 55% conversion to 2270 at 93% conversion. Less than doubling of the conversion (93% vs 55%) cannot provide a 2.6 fold increase of the Mn (2270 vs 890) maintaining a unimodal distribution.

The linear macromonomers formed at 55% conversion were incorporated into the polymer at higher conversions. The incorporation of macromonomer into growing polymer chains provides branched polymer. With continuous termination of polymeric radicals by the cobalt catalyst, such an incorporation leads to polymer with a structure containing "branches-on-branches"—in the extreme, it is hyperbranched.

Confirmation of the macromonomer reincorporation into the polymer back-bone was provided by MALDI mass spectroscopy. As seen on the MALDI spectra, at conversions <50% the polymer contains from 1 to 5 MMA units per chain. For Mn≈900, it means that the polymer is enriched with MMA vs composition of the initial monomer solution. As a result, the concentration of unreacted MMA monomer in the solution decreases faster than that of BA. At 55% conversion, more than 70% of the original MMA is consumed.

Fewer MMA units are available to be incorporated into the high molecular weight polymer formed at conversions >60% than at lower conversions if polymer that forms at high conversion does not incorporate previously formed macromonomer. Incorporation of the previously-formed macromonomer would provide MMA to the high molecular weight polymer. The MALDI spectrum of the polymer at 93% conversion demonstrated this clearly. The MALDI spectrum of the polymer at 93% conversion becomes unresolved at masses >2500 due to the high levels of MMA incorporation.

Example 138

A reaction mixture containing 4 mg of the CTC-catalyst (COBF), 32 mg of VAZO®-88, 2 ml of butyl acrylate, 6 ml MMA-trimer, 0.2 ml of methyl methacrylate and 4 ml of 1,2-dichloroethane was degassed by three freeze-pump-thaw cycles and put into an oil bath at 90° C. Samples of the reaction mixture were taken after 1.5 hours, 3 hours, 7 hours and 22 hours. Initial GPC analysis shows that molecular weight of the polymeric product increases with time. Comparison of GPC data with that of KIDS and MALDI shows that in the first case the average measured MW are lower than expected in case of higher conversion samples. The first samples had readily observable quantities of vinylene protons (1H NMR spectra), indicating the formation of methacrylate-terminated polymer at the beginning of the CTC process. All of these observations are consistent with the proposed scheme.

What is claimed is:

1. A process for forming a polymer whose polymer architecture is controlled to modify properties of said polymer, said process comprising:

free radical polymerizing at a temperature from about 80° to 170° C. and in the presence of a cobalt-containing chain transfer agent and a free radical initiator at least two unsaturated monomers A and B defined by the formula:

$$CH_2=CXY$$

wherein

X for monomer A is H and X for monomer B is $CH_3$ or $CH_2OH$;

Y is selected from the group consisting of OR, $O_2CR$, halogen, $CO_2H$, COR, $CO_2R$, CN, $CONH_2$, CONHR, $CONR_2$ AND R';

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, pimary amino, secondary amino, teritary amino, isocyanato, sulfonic acid and halogen; and the number of carbons in said alkyl groups is from 4 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, pimary amino, secondary amino, teritary amino, isocyanato, sulfonic acid substituted and unsubstituted alkyl, substituted and unsubstituted aryl, substituted and unsubstituted olefin and halogen provided when X=H, R' is not an unsubstituted aryl;

wherein the improvement comprises controlling said polymer architecture by:

introducing said monomers A and B at a molar ratio of A:B in the range of about 1,000:1 to 2:1 and by employing steps selected from the group consisting of:

I decreasing the molar ratio of A:B from about 1,000:1 toward 2:1;

II increasing the temperature from above 80° C. toward 170° C.;

III increasing the conversion of said monomers to said polymer toward 100% from less than about 50%;

IV choosing monomers A and B such that the ratio of the chain transfer constant of A:B is decreased to below 1;

V increasing the concentration of cobalt chain transfer agent; and a combination thereof; whereby:
steps for lowering molecular weight of said polymer comprise at least one of said steps I, II, IV and V;
steps for effecting a higher degree of vinyl-terminated end groups in said polymer comprise at least one of said steps I, II, IV and V; and
steps for increasing branching in said polymer comprise at lest one of steps I, II, IV, and V with step III.

2. A process for forming a polymer whose polymer architecture is controlled to modify properties of said polymer, said process comprising:
free radical polymerizing at a temperature from about 80° to 170° C. and in the presence of a cobalt-containing chain transfer agent and a free radical initiator at least two unsaturated monomers C and D defined by the formula:

$$CH_2=CXY$$

wherein
X for monomers C and D is H;
Y for monomer C is selected from the group consisting of OR, $O_2CR$, halogen, $CO_2H$, COR, $CO_2R$, CN, $CONH_2$, CONHR, and $CONR_2$; and Y for monomer D is R' wherein;
R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and
R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen provided when X=H, R' is not an unsubstituted aryl;
wherein the improvement comprises steps for controlling said polymer architecture by:
introducing said monomers C and D at a molar ratio of C:D in the range of about 1,000:1 to 2:1 and decreasing the ratio of C:D from about 1,000:1 toward 2:1; or increasing the temperature from above 80° C. toward 170° C.

3. The process according to claim 1 wherein the improvement comprises polymerizing monomer(s) in the presence of an excess of a olefin, $Y^1Y^2C=CY^3Y^4$, wherein:
$Y^1$ and $Y^2$, and optionally $Y^2$ and $Y^4$, are each independently selected from the group consisting of —CH(O), —CN, —C(O)$OR^5$, —C(O)$NR^6R^7$, —$CR^8$(O), alkyl, aryl, substituted alkyl, substituted aryl; or
where $Y^1$ and $Y^3$ or $Y^2$ and $Y^4$ are combined in a cyclic structure which includes any of the above functionalities, or can be —C(O)—$(CH_2)_x$—, —C(O)—O—$(CH_2)_x$—, —C(O)O—C(O)—, —C(O)$(CH_2)_x$—, —C(O)$NR^9$-$(CH_2)_x$—, wherein x=1–12, $R^5,R^6,R^7,R^8$, or $R^9$ are hydrogen, alkyl, aryl, substituted alkyl, or substituted aryl; and where at least one of $Y^1$ and $Y^3$ is selected from the group consisting of —CH(O), —CN, —C(O)$OR^5$, —C(O)$NR^6R^7$, —$CR^8$(O), aryl, substituted aryl; and the remaining of $Y^2$ and $Y^4$ are —H.

4. The process according to claim 1 comprising selecting A and B so the ratio of their chain transfer constants is less than 1, whereby functionality derived from monomer B will be located on the vinyl-terminated end of the polymer.

5. The process according to claim 1 in which monomer A is at least one member selected from the group consisting of substituted and unsubstituted alkyl acrylates, substituted and unsubstituted acrylamides, acrylonitrile, and vinyl esters; and monomer B is at least one member selected from the group consisting of:
a) substituted and unsubstituted α-methyl styrenes;
b) alkyl methacrylates
c) methacrylonitrile;
d) substituted or unsubstituted methacrylamide;
e) 2-chloropropene,
f) 2-fluoropropene,
g) 2-bromopropene
h) methacrylic acid,
i) itaconic acid,
j) itaconic anhydride,
k) substituted and unsubstituted styrenics, and
l) isopropenyl esters;
alkyl being $C_1$ to $C_{12}$ and substituents being selected from the group carboxylic acid, carboxylic ester, epoxy, hydroxyl, alkoxy, primary amino, secondary amino, tertiary amino, isocyanato, sulfonic acid and hydrogen.

6. The process according to claim 5 in which said monomer A is at least one member selected from the group consisting of alkyl acrylate, acrylamide, acrylonitrile and vinyl ester.

7. The process according to claim 2 in which monomer C is at least one member selected from the group consisting of substituted and unsubstituted alkyl acrylates, substituted and unsubstituted acrylamides, acrylonitrile, and vinyl esters; and monomer B is at least one member selected from the group consisting of:
a) substituted and unsubstituted α-methyl styrenes;
b) alkyl methacrylates
c) methacrylonitrile;
d) substituted and unsubstituted methacrylamide;
e) 2-chloropropene,
f) 2-fluoropropene,
g) 2-bromopropene
h) methacrylic acid,
i) itaconic acid,
j) itaconic anhydride,
k) substituted and unsubstituted styrenics, and
l) isopropenyl esters;
alkyl being $C_1$ to $C_{12}$ and substituents being selected from the group carboxylic acid, carboxylic ester, epoxy, hydroxyl, alkoxy, primary amino, secondary amino, tertiary amino, isocyanato, sulfonic acid and hydrogen.

* * * * *